(12) United States Patent
Albert

(10) Patent No.: US 9,544,252 B2
(45) Date of Patent: Jan. 10, 2017

(54) COMPRESSING AND DECOMPRESSING ELECTRONIC MESSAGES IN MESSAGE THREADS

(75) Inventor: Alon Albert, Campbell, CA (US)

(73) Assignee: Google Inc., Mountain View, CA (US)

( * ) Notice: Subject to any disclaimer, the term of this patent is extended or adjusted under 35 U.S.C. 154(b) by 795 days.

(21) Appl. No.: 13/273,829

(22) Filed: Oct. 14, 2011

(65) Prior Publication Data
US 2015/0195225 A1 Jul. 9, 2015

(51) Int. Cl.
*G06F 15/173* (2006.01)
*H04L 12/58* (2006.01)

(52) U.S. Cl.
CPC .............. *H04L 51/063* (2013.01); *H04L 51/16* (2013.01)

(58) Field of Classification Search
CPC ....................................................... H04L 51/08
USPC .......................................................... 709/206
See application file for complete search history.

(56) References Cited

U.S. PATENT DOCUMENTS

| 7,254,712 | B2 | 8/2007 | Godfrey |
| 7,287,097 | B1 * | 10/2007 | Friend et al. ................. 709/248 |
| 7,346,501 | B2 | 3/2008 | Mathur |
| 7,895,271 | B1 | 2/2011 | Malik |
| 8,126,981 | B2 | 2/2012 | Adams |
| 8,451,940 | B2 | 5/2013 | Yang |
| 8,589,403 | B2 | 11/2013 | Marquardt |
| 2006/0101115 | A1 * | 5/2006 | Gleckman ..................... 709/203 |

FOREIGN PATENT DOCUMENTS

| EP | 2677714 A1 | 12/2013 |
| WO | WO2008144926 A1 | 12/2008 |
| WO | WO2008144928 A1 | 12/2008 |

\* cited by examiner

*Primary Examiner* — Adnan Mirza
(74) *Attorney, Agent, or Firm* — Fish & Richardson P.C.

(57) ABSTRACT

Systems, methods, and computer programs encoded on a computer storage medium, for compressing and decompressing electronic messages in message threads. In one aspect, a method is performed by a system the includes one or more data processing devices. The method includes receiving an outgoing electronic message, determining that the outgoing electronic message is a follow-up message in an electronic message thread, determining, by the system, textual content in the electronic message thread that is available to the decompressing device, determining a correspondence between symbols or groups of symbols in the textual content that is available to the decompressing device and code words in accordance with a coding scheme, compressing the outgoing electronic message using the determined correspondence between the symbols or groups of symbols and the code words, and transmitting the compressed outgoing electronic message.

29 Claims, 9 Drawing Sheets

COMPRESSING AND DECOMPRESSING ELECTRONIC MESSAGES IN MESSAGE THREADS

BACKGROUND

This specification relates to compression of data communication, in particular, the compression and decompression of electronic mail and other electronic messages that are in message threads.

An electronic message thread (also referred to as an "electronic conversation") is a series of electronic mail or other electronic messages. After an initial electronic message has been composed and distributed to one or more recipients, subsequent follow-up electronic messages in the thread are composed in response and generally concern related subject matter. The follow-up electronic messages can be, e.g., reply messages or forwarded messages. The electronic messages in electronic message threads have designated recipients. For example, the electronic messages may be addressed, e.g., to the composer of the initial message, to another recipient of the initial message, to a new recipient, or to combinations of such recipients. Electronic mail (i.e., e-mail) messages, chat messages, instant messaging messages, posts to asymmetric social networks, and other electronic messages with designated recipients can all form electronic message threads.

Data compression reduces the number of bits or other information-bearing units that are needed to encode information. Data compression generally relies on a defined coding scheme—the logic of which is used to both compress a source and decompress the compressed version. A coding scheme can be used to encode symbols or groups of symbols in a source (e.g., letters or other characters in an electronic message) as relatively shorter code words that are later decoded to return the source symbols or groups of symbols.

In some instances, the correspondence between the symbols or groups of symbols and the code words is determined based on how often symbols or groups of symbols appear or are estimated to appear in the source that is to be compressed. Estimates of how often the symbols or groups of symbols appear can be obtained from "seed dictionaries" such as, e.g., an English language dictionary for an English language message, a German dictionary for an German language message, news articles in a corresponding language, or the like. Such seed dictionaries thus provide an estimate of the frequency of symbols and groups of symbols in the source document to which a coding scheme is applied.

If a particular electronic message includes a single symbol or a series of symbols that occurs relatively often, representing those symbol(s) by a relatively shorter code word reduces the length of that particular message. However, the correspondence between code words and symbols or groups of symbols will generally be different when a different message is compressed. This is akin to the use of the word "refrain" in musical lyrics, where the characters and words that form the refrain are different in different songs. In other words, the characters and words represented by the word "refrain" are chosen in light of each individual song's content so that the lyrics can be compressed. With more common source symbols or groups of symbols in each particular message coded using shorter code words and less common source symbols or groups of symbols coded using longer code words, the extent of compression of each particular message is increased.

Huffman coding is a coding scheme that uses a specific logic for choosing the correspondence between code words and the symbols or groups of symbols they represent based on how often symbols or groups of symbols appear in a seed dictionary. The code words chosen by Huffman coding have different lengths and are assigned to represent symbols or groups of symbols based on the probability that the seed dictionary symbols or groups of symbols occur or are estimated to occur in the seed dictionary. Huffman coding is described, e.g., in the article entitled "A Method for the Construction of Minimum-Redundancy Codes." David A. Huffman, Proceedings of the I.R.E., September 1952, pp. 1098-1102. Other coding schemes, such as arithmetic coding and LZW coding, also determine the correspondence between the seed dictionary symbols or groups of symbols and the code words based on how often symbols or groups of symbols appear or are estimated to appear in a seed dictionary.

Huffman coding and other coding schemes yield a prefix code (also known as a "prefix-free code"). A prefix code is a code in which none of the valid code words are a prefix of any other valid code word. A message encoded using a prefix code can be transmitted as a sequence of concatenated code words without markers to frame the words in the message. A recipient can decode the message by repeatedly finding and removing prefixes that form the valid code words.

SUMMARY

This specification describes technologies relating to compression of message threads.

In a first aspect, a method is performed by a system the includes one or more data processing devices. The method includes receiving, at the system, an outgoing electronic message, determining, by the system, that the outgoing electronic message is a follow-up message in an electronic message thread, determining, by the system, textual content in the electronic message thread that is available to the decompressing device, determining, by the system, a correspondence between symbols or groups of symbols in the textual content that is available to the decompressing device and code words in accordance with a coding scheme, compressing, by the system, the outgoing electronic message using the determined correspondence between the symbols or groups of symbols and the code words, and transmitting, from the system, the compressed outgoing electronic message.

In a second aspect, a method is performed by a system the includes one or more data processing devices. The method includes receiving, at the system, an incoming electronic message, determining, by the system, that the incoming electronic message has been compressed using symbol/code word correspondences yielded by application of a coding scheme to a prior message in an electronic message thread to which the incoming electronic message belongs, determining, by the system, a correspondence between symbols or groups of symbols in the textual content of the prior message and code words in accordance with the coding scheme, and decompressing, by the system, the incoming electronic message using the determined correspondence between the symbols or groups of symbols and the code words.

In a third aspect, a device includes a transmitter, and one or more data processing devices programmed to implement a seed dictionary selection module programmed to perform operations comprising selecting textual content in a same thread as an outgoing electronic message for use as a seed dictionary for compressing the outgoing electronic message and a message compression module programmed to perform operations comprising compressing the outgoing electronic message in accordance with code words determined using the textual content selected by the seed dictionary selection module as the seed dictionary. The outgoing electronic message includes at least some textual content absent from the selected textual content.

In a fourth aspect, a device includes a receiver, and one or more data processing devices programmed to implement a compression recognition module programmed to perform operations comprising recognizing that an incoming electronic message is compressed using symbol/code word correspondences yielded by applying a coding scheme to a prior message in a thread in which the incoming electronic message appears, a mapping determination module programmed to determine the mapping between symbols or groups of symbols and code words used to compress the incoming electronic message, and a message decompression module programmed to perform operations comprising decompressing the incoming electronic message using the mapping determined by the mapping determination module.

The first aspect, the second aspect, the third aspect, and the fourth aspect can each include one or more of the following features. A preexisting mapping of the symbols or groups of symbols and the code words in accordance with the coding scheme can be located by a system or device in a data storage device. Correspondence between the symbols or groups of symbols and the code words can be determined by identifying a prior message in the electronic message thread that is available to the decompressing device and encoding text of the prior message using the coding scheme in response to the identification of the prior message. An identifier of the textual content in the electronic message thread that is available to the decompressing device can be transmitted in association with the compressed outgoing electronic message. An identifier of the coding scheme can be transmitted in association with the compressed outgoing electronic message. An outgoing electronic message can be determined to be a follow-up message in an electronic message thread by one or more of a) recognizing that textual content in a subject line in a current header of the outgoing electronic message identifies the message as a follow-up message and b) recognizing that the electronic message includes one or more message headers of prior message in the electronic message thread. An outgoing electronic message can be received over a wired connection in a data communication network. A compressed outgoing electronic message can be relayed over a wireless connection.

Correspondence between the symbols or groups of symbols and the code words can be determined by locating, in a data storage device, a preexisting mapping of the symbols or groups of symbols and the code words in accordance with the coding scheme. Correspondence between symbols or groups of symbols and code words can be determined by locating, in a data storage device, the prior message in the electronic message thread, and encoding text of the prior message using the coding scheme in response to the identification of the prior message. An identifier of the prior message in the electronic message thread can be received. The identifier can be associated with the incoming electronic message. A preexisting mapping of the symbols or groups of symbols in the prior message and the code words can be located or text of the prior message can be located in a data storage device using the received identifier. It can be determined that the incoming electronic message has been compressed by the receiving of the identifier of the prior message. An identifier of the coding scheme can be received in association with the incoming electronic message. An incoming electronic message can be received over a wireless connection. A system can relay a decompressed outgoing electronic message to a final destination device over a wired connection in a data communication network.

One or more data processing devices can be programmed to implement an encoding module programmed to perform operations comprising determining code words that express symbols or groups of symbols in the textual content selected by the seed dictionary selection module in accordance with a coding scheme. A seed dictionary selection module can be programmed to perform operations that include identifying that a prior message in the same thread as the outgoing electronic message was transmitted or received by a decompressing device that is to decompress the outgoing electronic message and, in response to the identification that the prior message was transmitted or received by the decompressing device, selecting the same message as the source of the textual content. A device performing the recited methods or forming the recited devices can be a handheld device comprising a user interface. A transmitter can include a wireless transmitter. A seed dictionary selection module can be programmed to perform operations that include receiving, over the user interface, an indication that the outgoing electronic message is to be composed using the user interface as a follow-up message to a prior message in the same thread, and, in response to the receipt of the indication, selecting textual content of the prior message for use as the seed dictionary. A data storage device can be accessible by one or more data processing devices and store mappings of symbols or groups of symbols in text of a plurality of prior messages and code words. A data storage device can be accessible by the one or more data processing devices and store information identifying a plurality of electronic messages and a plurality of devices as having transmitted or received the electronic messages in the plurality. One or more data processing devices can be programmed to instruct the transmitter to transmit the compressed outgoing electronic message in association with an identifier of the textual content selected by the seed dictionary selection module. One or more data processing devices can be programmed to instruct the transmitter to transmit the compressed outgoing electronic message in association with an identifier of the coding scheme used to determine the code words with the textual content selected by the seed dictionary selection module.

A device performing the recited methods or forming the recited devices can include a network interface configured to form a wired interface with a data communication network. The transmitter can include a wireless transmitter. One or more data processing devices can be programmed to perform operations that include either a) recognizing that textual content in a subject line in a current header of the outgoing electronic message identifies the message as a follow-up message or b) recognizing that the electronic message includes one or more message headers of prior message in the electronic message thread. One or more data processing devices can also be programmed to implement an encoding module programmed to perform operations comprising determining code words that express symbols or groups of symbols in the prior message in the thread. A device performing the recited methods or forming the recited devices can be a handheld device comprising a user interface. A receiver can be a wireless receiver. One or more data processing devices can be programmed to perform operations that include receiving, over the wireless receiver, the incoming electronic message and present the decompressed incoming electronic message over the user interface.

A device can include a data storage device accessible by the one or more data processing devices and storing mappings of symbols or groups of symbols in text of a plurality of prior messages and code words. A mapping determination module can be programmed to access the mappings of symbols or groups of symbols stored at the data storage device to determine the mapping used to compress the incoming electronic message.

A device performing the recited methods or forming the recited devices can include a data storage device accessible by the one or more data processing devices, the data storage device storing text of a plurality of prior messages. A mapping determination module can be programmed to determine an identifier of the prior message in the thread that is associated with the incoming electronic message and identify the text of the prior message in the thread in the data storage device using the identifier of the prior message. A device performing one of the recited methods or forming the recited devices can include comprises a network interface configured to form a wired interface with a data communication network. A receiver can include a wireless receiver and one or more data processing devices can be programmed to perform operations that include receiving the incoming electronic message over the wireless receiver and relaying, by the system, the decompressed outgoing electronic message to a final destination device over the wired interface.

The details of one or more implementations of the subject matter described in this specification are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
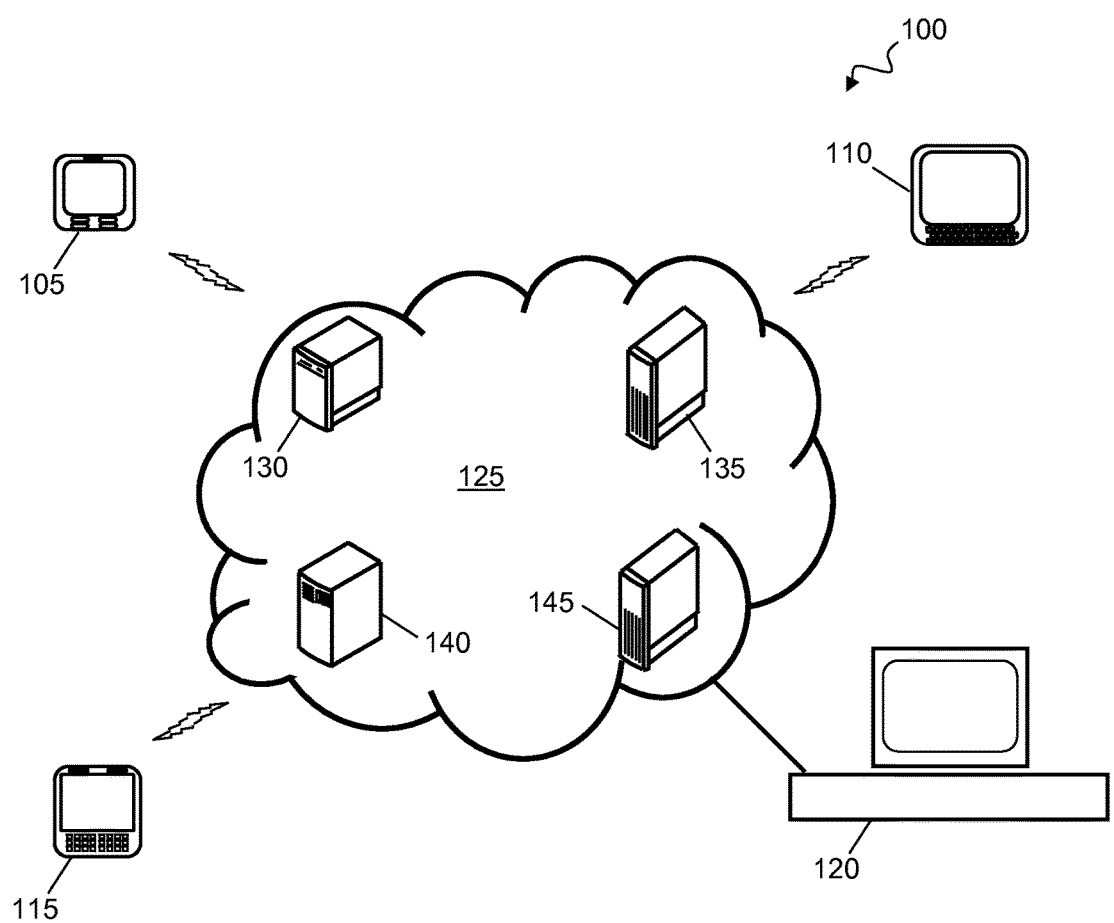
FIG. 1 is a schematic representation of an electronic messaging system in which electronic mail and other electronic messages are compressed.

FIG. 1 is a schematic representation of an electronic messaging system 100 in which electronic mail and other electronic messages are compressed. System 100 includes multiple electronic devices 105, 110, 115, 120 that all include wired or wireless data communication components and exchange electronic messages with one another over a data communication network 125. As described further below, the electronic messages can form an electronic message thread in which much of the text and other content of the thread is repeated.

Electronic devices 105, 110, 115, 120 can be, e.g., desk, laptop, or pad computers, smart phones, PDAs, gaming devices, book readers, or the like. Example wireless data communication components can include, e.g. mobile phone transceivers, WiFi transceivers, and the like.

Data communication network 125 includes multiple electronic message transmission systems 130, 135, 140, 145 that participate in the exchange of electronic messages between electronic devices 105, 110, 115, 120. For example, electronic message transmission system 130 transmits electronic messages to electronic device 105. Electronic message transmission system 135 transmits electronic messages to electronic device 110. Electronic message transmission system 140 transmits electronic messages to electronic device 115. Electronic message transmission system 145 transmits electronic messages to electronic device 120. Electronic message transmission systems 130, 135, 140, 145 can each include a network interface that exchanges data with other devices on network 125, one or more data processing devices, and one or more wireless transmission devices. The network interface is generally a wired network interface in that the data is carried over a solid medium such as a metal wire or an optical cable. Examples of suitable data processing devices include message servers (e.g., electronic mail servers, text message servers) or other data processing devices that interoperate with one or more wireless transmission devices to transmits electronic messages to electronic device 110. Examples of such wireless transmission devices include, e.g., a wireless access point (WAP), a cellular base station, or other wireless communications transmitter. Electronic message transmission systems 130, 135, 140, 145 can also exchange data amongst themselves (e.g., within data communication network 125) along wired data links, wireless data links, or data links that include both wired and wireless stretches.

Figure 2:
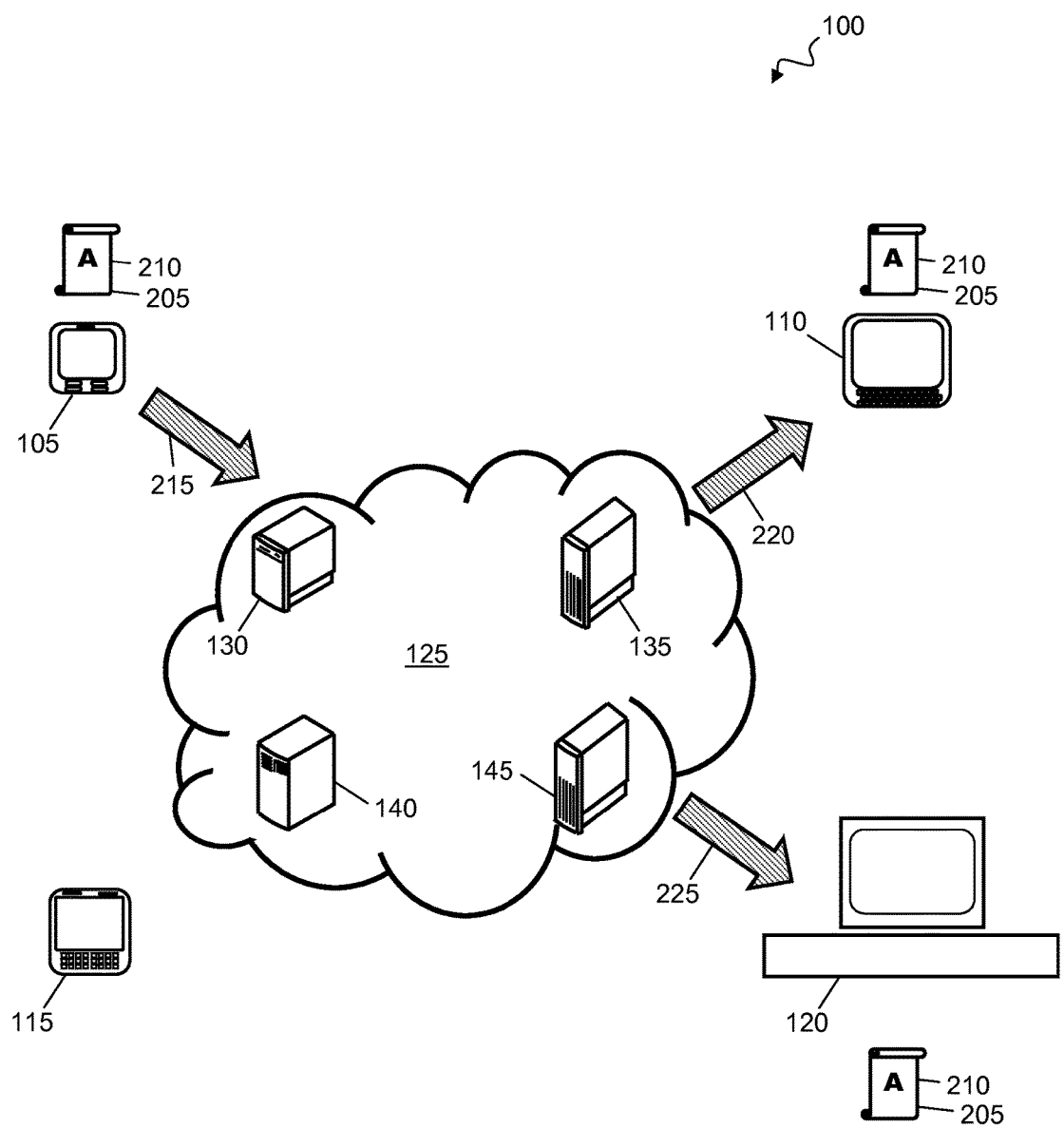
FIG. 2 schematically illustrates the initiation of an electronic message thread in the system of FIG. 1.

FIG. 2 schematically illustrates the initiation of an electronic message thread in system 100. In particular, a user who operates electronic device 105 composes an initial electronic message 205 that includes textual content 210. In many instances, textual content 210 includes both the text actually authored by the user who operates electronic device 105 as well as signatures, attachments, text that has been clipped-and-pasted, or other textual content. In some instances, the textual content of electronic message 205 is not visible per se as text to a human composer or reader. For example, mark-up tags and other textual content can be included in electronic message 205, e.g., to inform a recipient device about display and other characteristics of electronic message 205. In some instances, electronic message 205 can also include non-textual content, such as images, graphic devices, icons, and the like.

Electronic message 205 is addressed to one or more designated individuals (namely, the users of electronic devices 110, 120). Initial electronic message 205 is transmitted wirelessly from electronic device 105 in one or more transmissions 215 and received, e.g., by electronic message transmission system 130 in data communication network 125. Electronic message transmission system 130 directs initial electronic message 205 to the appropriate of electronic message transmission systems 135, 140, 145 (namely, electronic message transmission systems 135, 145 in the illustrated example) using the data communication functionality provided by data communication network 125. Those of electronic message transmission systems 135, 140, 145 that receive initial electronic message 205 transmit initial electronic message 205 to the appropriate of electronic devices 110, 115, 120 (namely, electronic devices 110, 120) in respective wireless transmissions 220, 225. Those of electronic devices 110, 115, 120 that are operated by the addressed users addressed thus receive initial electronic message 205 and its textual content 210. The receiving electronic devices 110, 115, 120 can store information characterizing initial electronic message 205 in one or more persistent data storage devices. As described further below, the stored information can include, e.g., the entire content of initial electronic message 205, a portion of the content (e.g., only the textual content) of initial electronic message 205, or a map of the correspondence between code words and symbols or groups of symbols in initial electronic message 205.

Figure 3:
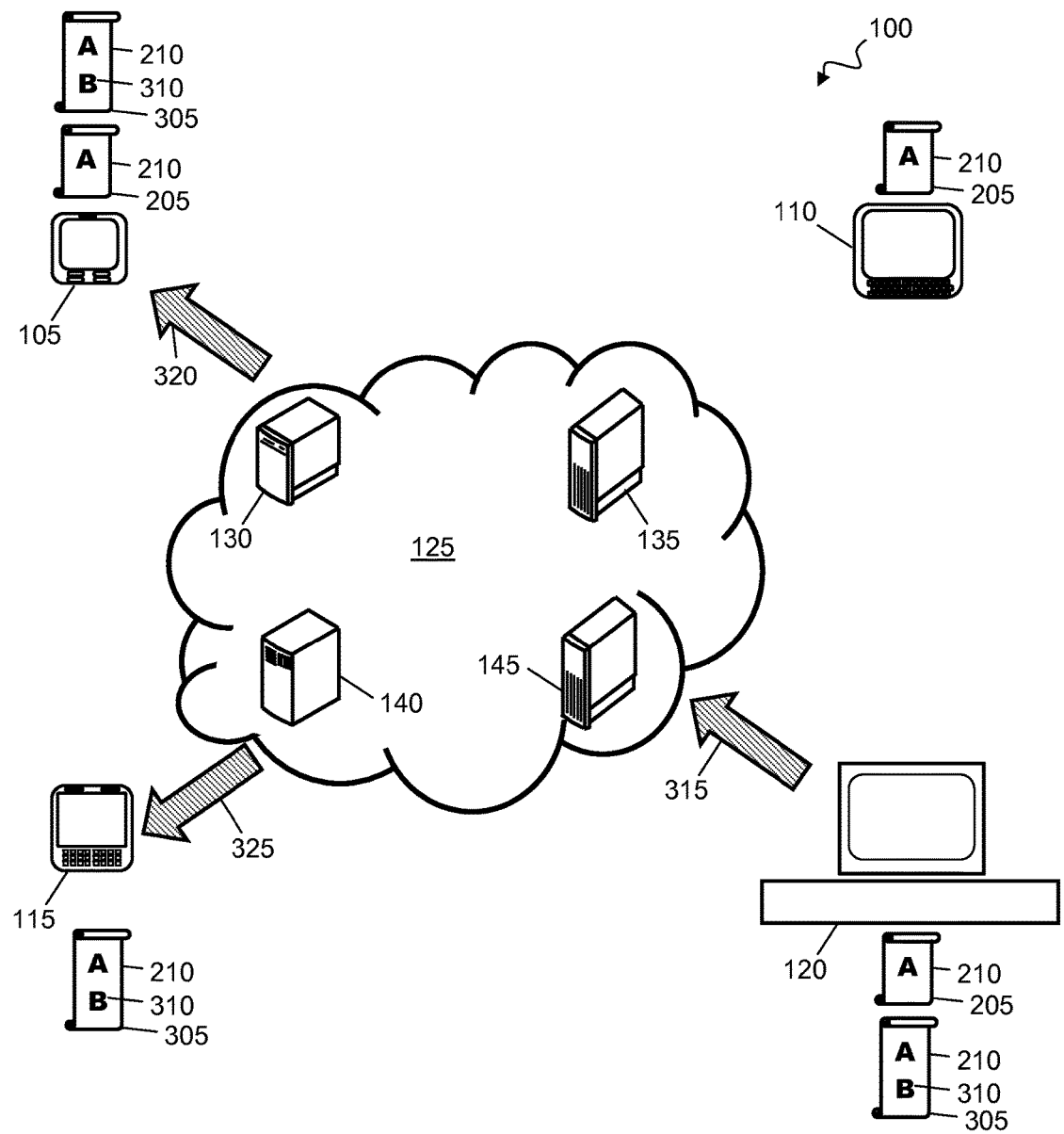
FIGS. 3, 4 schematically illustrate exchange of an electronic message thread in the system of FIG. 1.

FIG. 3 schematically illustrates exchange of an electronic message thread in system 100. In particular, a user who operates electronic device 120 composes a first follow-up electronic message 305 that includes all or a part of textual content 210 and textual content 310. Follow-up electronic messages are messages in the same thread as an initial electronic message and generally include some or all of the content of the initial electronic message and any intervening electronic messages in the thread. For example, follow-up electronic messages include reply electronic messages that are addressed at least to the composer of the immediately preceding message in the thread and forwarded electronic messages that are addressed at least to one other user who was not addressed by the immediately preceding message in the thread. Since electronic messages are often addressed to multiple recipients (e.g., by "carbon copying" or "CCing," by "blind carbon copying" or "BCCing," or otherwise) and message designations (e.g., as "reply messages" or "forwarded messages") are generally not strictly enforced, reply electronic messages can also be addressed to one or more users who were not addressed by the immediately preceding message in the thread. Further, forwarded electronic messages can also be addressed to the composer of the immediately preceding message in the thread.

In many instances, textual content 310 of first follow-up electronic message 305 includes both the text actually authored by the user who operates electronic device 120 as well as signatures, attachments, text that has been clipped-and-pasted, or other textual content, as well as textual content that is not visible per se as text to a human composer or reader. First follow-up electronic message 305 is addressed to one or more designated individuals (namely, the users of electronic devices 105, 115). First follow-up electronic message 305 is transmitted wirelessly from electronic device 120 in one or more transmissions 315 and received, e.g., by electronic message transmission system 145 in data communication network 125. Electronic message transmission system 145 directs first follow-up electronic message 305 to the appropriate of electronic message transmission systems 130, 135, 140 (namely, electronic message transmission systems 130, 140) using the data communication functionality provided by data communication network 125. Those of electronic message transmission systems 130, 135, 140 that receive first follow-up electronic message 305 transmit first follow-up electronic message 305 to the appropriate of electronic devices 105, 110, 115 (namely, electronic devices 105, 115) in respective wireless transmissions 320, 325. Those of electronic devices 105, 110, 115 that are operated by the addressed users thus receive first follow-up electronic message 305 and its textual content 210, 310. The receiving electronic devices 110, 115, 120 can store information characterizing first follow-up electronic message 305 in one or more persistent data storage devices. As described further below, the stored information can include, e.g., the entire content of first follow-up electronic message 305, a portion of the content (e.g., only the textual content or only the textual content that is not visible per se as text) of first follow-up electronic message 305, or a map of the correspondence between code words and symbols or groups of symbols in first follow-up electronic message 305.

Figure 4:
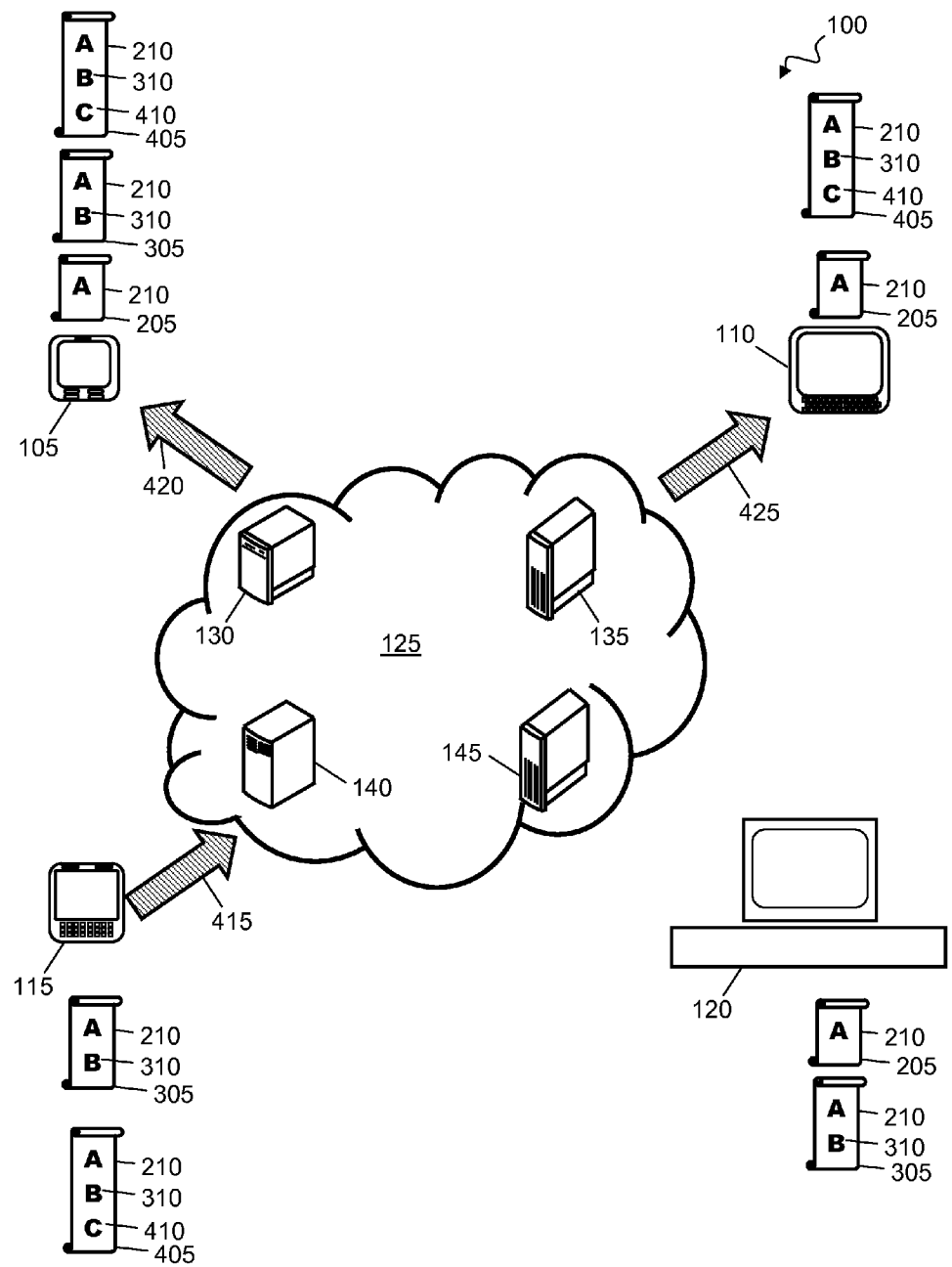

FIG. 4 schematically illustrates exchange of an electronic message thread in system 100. In particular, a user who operates electronic device 115 composes a second follow-up electronic message 405 that includes all or a part of textual content 210, 310 and textual content 410. In many instances, textual content 410 includes both the text actually authored by the user who operates electronic device 115 as well as signatures, attachments, text that has been clipped-and-pasted, or other textual content, as well as textual content that is not visible per se as text to a human composer or reader. Second follow-up electronic message 405 is addressed to one or more designated individuals (namely, the users of electronic devices 105, 110). Second follow-up electronic message 405 is transmitted wirelessly from electronic device 115 in one or more transmissions 415 and received, e.g., by electronic message transmission system 145 in data communication network 125. Electronic message transmission system 140 directs second follow-up electronic message 405 to the appropriate of electronic message transmission systems 130, 135, 140 (namely, electronic message transmission systems 130, 135) using the data communication functionality provided by data communication network 125. Those of electronic message transmission systems 130, 135, 140 that receive second follow-up electronic message 405 transmit second follow-up electronic message 405 to the appropriate of electronic devices 105, 110, 115 (namely, electronic devices 105, 110) in respective wireless transmissions 420, 425. Those of electronic devices 105, 110, 115 that are operated by the addressed users thus receive second follow-up electronic message 405 and its textual content 210, 310, 410. The receiving electronic devices 110, 115, 120 can store information characterizing second follow-up electronic message 405 in one or more persistent data storage devices. As described further below, the stored information can include, e.g., the entire content of second follow-up electronic message 405, a portion of the content (e.g., only the textual content) of second follow-up electronic message 405, or a map of the correspondence between code words and symbols or groups of symbols in second follow-up electronic message 405.

Figure 5:
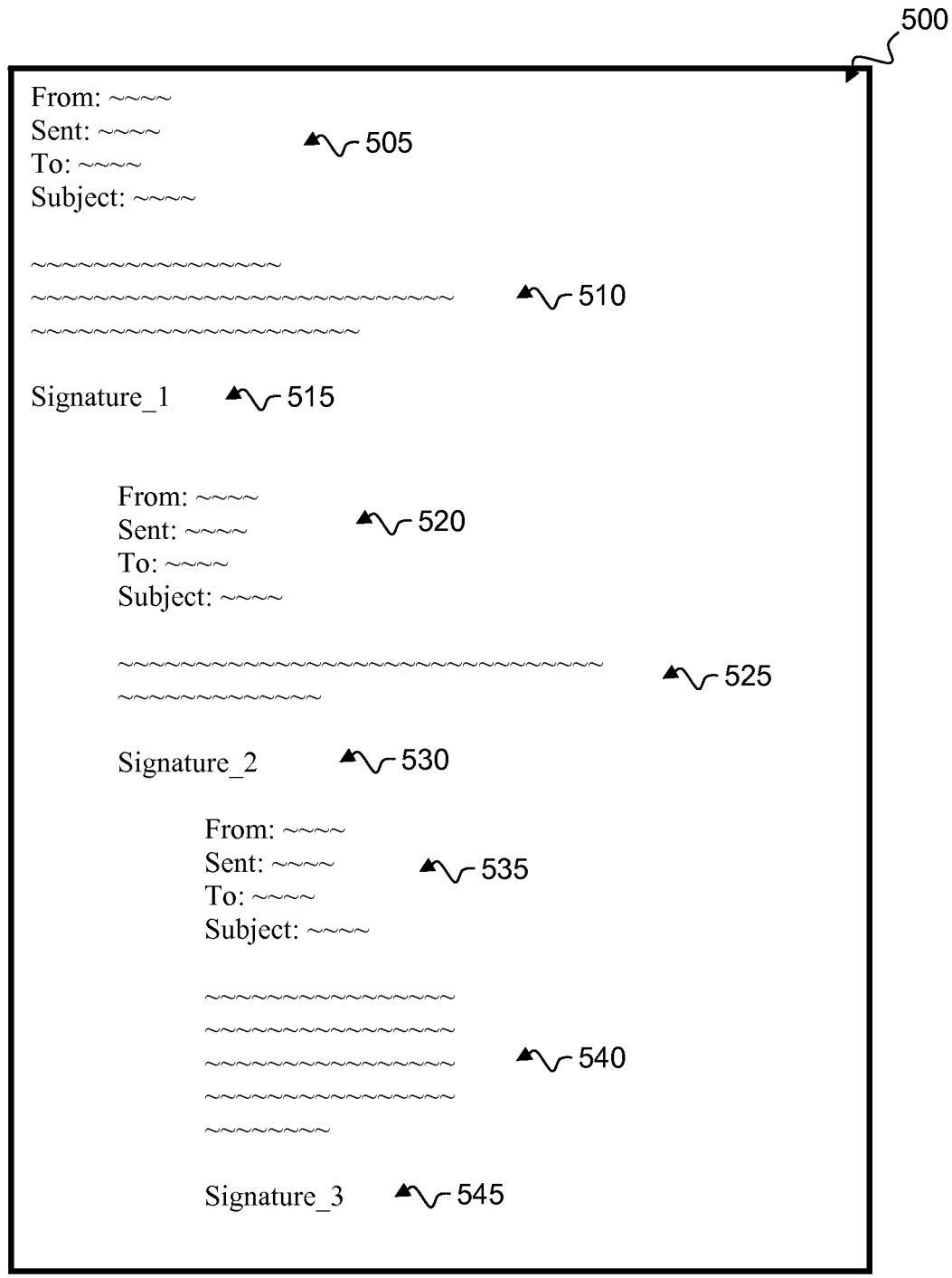
FIG. 5 is a schematic representation of an example follow-up electronic message in an electronic message thread.

FIG. 5 is a schematic representation of an example follow-up electronic message 500 in an electronic message thread. Follow-up electronic message 500 includes a current header 505, current textual content 510, a current appendix 515, a message header 520 of a first prior message, textual content 525 of the first prior message, appendix 530 of the first prior message, message header 535 of a second prior message, textual content 540 of the second prior message, and appendix 545 of the second prior message.

Current header 505 includes text that characterizes aspects of follow-up electronic message 500. For example, in some implementations, current header 505 can include one or more of the following: text that characterizes the user who composed the current textual content 510 of follow-up electronic message 500 (e.g., a name and/or an electronic mail address), other recipients of follow-up electronic message 500, the time that follow-up electronic message 500 was sent and/or received, and a subject line of follow-up electronic message 500. Current textual content 510 can include text that is authored by the user who composed follow-up electronic message 500 as well as attachments, text that has been clipped-and-pasted, or other textual content that has been added by the composer. Current appendix 515 is text that is added to follow-up electronic message 500 either automatically or in response to a request by the composer of follow-up electronic message 500. For example, current appendix 515 can be a legal disclaimer or an electronic mail signature that identifies the composer of follow-up electronic message 500.

First prior message header 520 includes text that characterizes aspects of a first electronic message in the same thread as follow-up electronic message 500. In particular, first prior message header 520 includes text that characterizes the immediately preceding electronic message in the thread. In some implementations, first prior message header 520 includes one or more of the following: text that characterizes the user who composed the textual content 525 of the first prior message, (e.g., a name and/or an electronic mail address), other recipients of the first prior message, the time that the first prior message was sent and/or received, and a subject line of the first prior message. Textual content 525 of the first prior message can include text that was authored by the user who composed the first prior message as well as attachments, text that has been clipped-and-pasted, or other textual content that has been added by the composer. Appendix 530 is text that is added to the first prior message either automatically or in response to a request by the composer of the first prior message. For example, appendix 530 can be a legal disclaimer or an electronic mail signature that identifies the composer of the first prior message.

Second prior message header 535 includes text that characterizes aspects of a second electronic message in the same thread as follow-up electronic message 500. In particular, second prior message header 520 includes text that characterizes the electronic message immediately preceding the first electronic message in the thread. In some implementations, second prior message header 520 includes one or more of the following: text that characterizes the user who composed the textual content 540 of the second prior message, (e.g., a name and/or an electronic mail address), other recipients of the second prior message, the time that the second prior message was sent and/or received, and a subject line of the second prior message. Textual content 540 of the second prior message can include text that was authored by the user who composed the second prior message as well as attachments, text that has been clipped-and-pasted, or other textual content that has been added by the composer. Appendix 545 is text that is added to the second prior message either automatically or in response to a request by the composer of the second prior message. For example, appendix 545 can be a legal disclaimer or an electronic mail signature that identifies the composer of the second prior message.

As shown, the electronic messages in an electronic message thread that are exchanged within system 100 can rapidly grow in size. For example, a follow-up electronic message can include a relatively large amount of textual content and may include text that has that has been authored by different users, signatures, attachments, text that has been clipped-and-pasted, legal disclaimers, textual content that is not visible per se as text, or other text. The exchange of such large messages can consume large amounts of resources. For example, larger messages require relatively more transmission bandwidth and relatively more storage space.

In light of the resource consumption by large messages, some electronic messaging systems are designed to only transmit a redacted portion an electronic message from an electronic message transmission system to an electronic device by default. For example, such electronic messaging systems can transmit the first few lines of text by default and transmit the remainder of the large electronic message only upon request by the user of an electronic device. Such processes can consume time and impair a user's access to the textual content of a follow-up message.

Figure 6:
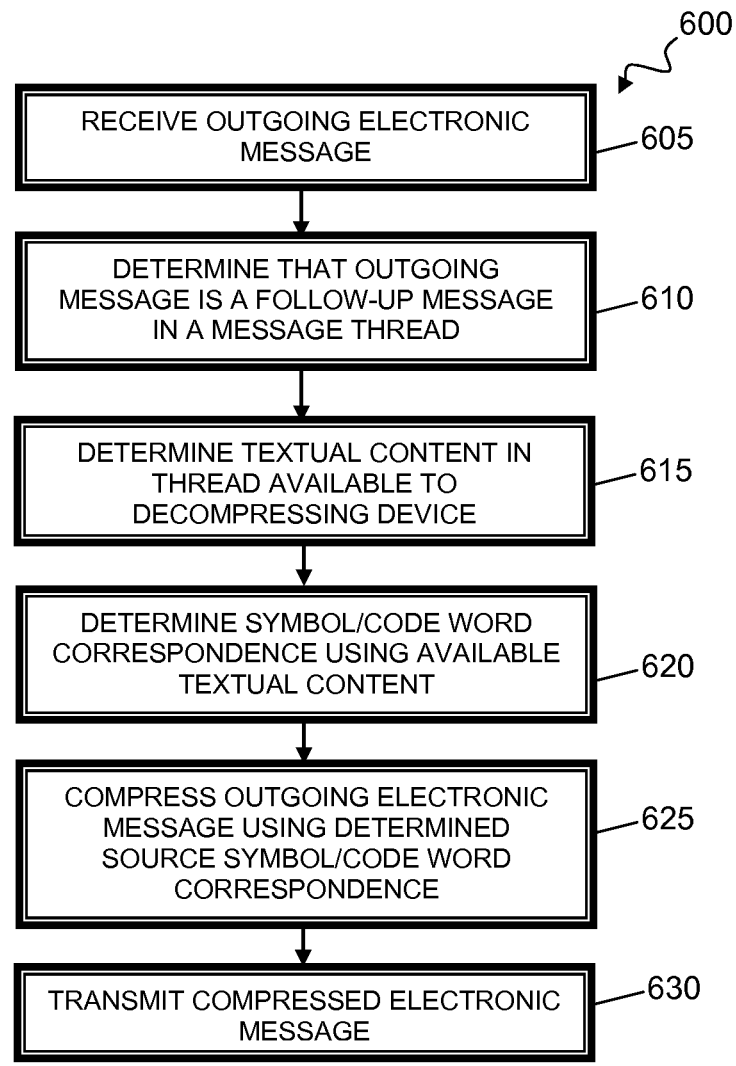
FIG. 6 is a flow chart of a process for compressing an outgoing follow-up electronic messages in an electronic message thread.

FIG. 6 is a flow chart of a process 600 for compressing an outgoing follow-up electronic messages in an electronic message thread. Process 600 can be performed by a system of one or more data processing devices that perform operations in accordance with the logic of one or more sets of machine-readable instructions. The instructions can be tangibly embodied in hardware, in software, or in combinations thereof. For example, process 600 can be performed by one or more data processing devices in electronic message transmission systems in a data communication network (e.g., electronic message transmission systems 130, 135, 140, 145 in data communication network 125). As another example, process 600 can be performed by electronic devices that are connected to a data communication network (e.g., electronic devices 105, 110, 115, 120). Process 600 can thus be performed at the device from which the outgoing follow-up electronic message originates (e.g., the device at which a user composes the follow-up electronic message) or at an intermediate device that relays the outgoing follow-up electronic message directly or indirectly to a device that is to decompress the follow-up electronic message.

In some implementations, process 600 can be performed by an electronic message server that recognizes that a request for service of an electronic message has been made by a device that includes a wireless receiver (e.g., a smartphone or other handheld device) and performs process 600 in anticipation of wireless transmission of the follow-up electronic message, thereby reducing resource consumption associated with the wireless transmission.

The system performing process 600 receives an outgoing electronic message that includes textual content at 605. The electronic message can be received, e.g., over a data communication link in a data communication network, from a memory accessible to the system, or from a human composer who may author, clip-and-paste, or otherwise compose the electronic message. The electronic message need not be received as a unitary whole. For example, the outgoing electronic message can be received in a collection of data packets. As another example, a first portion of the outgoing electronic message can be manually entered by a composer over a user interface and a second portion of the outgoing electronic message can be received from a memory accessible to the system performing process 600.

The system performing process 600 determines that the outgoing electronic message is a follow-up message in an electronic message thread at 610. The outgoing electronic message can be determined to be a follow-up message in a variety of different ways. For example, in some implementations, the system recognizes one or more message-reference headers in a follow-up message. A message-reference headers are headers in follow-up messages that identify one or more messages being replied to or forwarded. In other implementations, the system recognizes textual content in a subject line in a current header of the outgoing electronic message (e.g., the designations"RE" or "FW") that identifies the message as a follow-up message. As another example, an indication that the outgoing electronic message is s a follow-up message is received from a composer prior to composition, e.g., when a user interacts with a user interface to indicate that a reply or forwarded message is to be composed. As yet another example, the system recognizes that the electronic message includes one or more message headers of prior message(s). The inclusion of message headers of prior messages can be recognized, e.g., by determining that portions of the textual content in the received message match common message header terms and formats. As another example, the textual content of the received electronic message can be compared with the textual content of messages that are known to be available to the device that is to decompress the textual content. If a contiguous portion of the text of the received electronic message is identical to the textual content of a message that is known to be available, then the received electronic message is determined to be an outgoing follow-up message.

The system performing process 600 determines at least some of the textual content in the thread of the outgoing electronic message that is already available to the device that is to decompress the textual content at 615. The textual content can already be available to the decompressing device for a variety of different reasons. For example, the already-available textual content can previously have been received by the decompressing device in another electronic message in the same thread. As another example, the already-available textual content can be the textual content of the thread's initial electronic message that was composed at the decompressing device.

The system performing process 600 can determine textual content that is already available in a variety of ways. For example, when process 600 is performed by an electronic mail or other message server, then the performing electronic message transmission system can review a log of electronic messages that have already been served to the decompressing electronic device by the server. As another example, when process 600 is performed by an electronic device where a message is being composed, then the performing electronic device can review examine preceding electronic messages in the thread to determine the most recent preceding message in the thread that has been received by the decompressing device.

In some implementation, textual content that is not visible per se as text is excluded from the determination of the textual content in the thread that is already available. In other implementations, both textual content that is visible as text and textual content that is not visible per se as text are determined to already be available.

Using the at least some of the textual content that is determined to already have been available to the decompressing device as a seed dictionary, the system performing process 600 determines the correspondence between symbols or groups of symbols and code words at 620. In particular, the textual content that is already available to the decompressing device is used as a seed dictionary for determining the correspondence or mapping of symbols or groups of symbols to code words in the coding scheme. The correspondence can embody the frequency or estimated frequency at which symbols or groups of symbols appear in the textual content that is already available to the decompressing device, e.g., so that symbols or groups of symbols that appear more frequently in the textual content that is already available are represented by shorter code words. For example, in some implementations, Huffman coding or other coding schemes can be used.

In general, this determination of symbol/code word correspondence omits to consider a portion of the textual content of the follow-up message. In other words, the assignment of code words to represent symbols or groups of symbols need not embody the probability, or estimates of the probability, that the symbols or groups of symbols appear in portions of the textual content of the follow-up message that are not available to decompressing device. Such unavailable portions can include textual content added by a composer to a new outgoing electronic message or textual content of a prior message in the same message thread that was not sent to the decompressing device.

For example, in the context of FIG. 4, wireless transmission 420 can be compressed using a correspondence between symbols or groups of symbols and code words that was determined by using textual content 210, 310 as a seed dictionary. The assignment of the code words used to compress wireless transmission 420 does not consider the probability, or estimates of the probability, that the symbols or groups of symbols appear in textual content 410. In contrast, wireless transmission 425 can be compressed using a correspondence between symbols or groups of symbols and code words that was determined by using textual content 210 as a seed dictionary. The assignment of the code words used to compress wireless transmission 420 does not consider the probability, or estimates of the probability, that the symbols or groups of symbols appear in textual content 310, 410. Thus, the same electronic message can be compressed using a different map of code words and symbols or groups of symbols by, e.g., different electronic message servers.

The system performing process 600 compresses the outgoing electronic message using the determined correspondence between symbols or groups of symbols and code words at 625. Although the correspondence between symbols or groups of symbols and code words generally does not embody the frequency or estimated frequency at which symbols or groups of symbols appear in the entire outgoing message, the correspondence between symbols or groups of symbols and code words does embody the frequency or estimated frequency at which symbols or groups of symbols appear in a portion of the outgoing message, namely, the portion of the outgoing message that is already available to the decompressing device. A relatively effective compression of the outgoing electronic message is thus achieved.

The system performing process 600 transmits the compressed outgoing electronic message at 630. The transmission can be performed by the system performing process 600 itself (e.g., when process 600 is performed by an electronic device such as electronic devices 105, 110, 115, 120) or by one or more other devices operating in accordance with instructions received from the system performing process 600. In general, the compressed electronic message is transmitted in association with an identifier of the textual content that is already available to the decompressing device. For example, the textual content that is already available can be identified by a unique or other identifier of a message (e.g., a message ID) that includes the textual content used as a seed dictionary. Such an identifier can be disposed within the electronic message, appended to the electronic message, or conveyed separately from the electronic message (e.g., in a second message that identifies the electronic message). The compressed outgoing electronic message can be transmitted directly to the decompressing device or indirectly via one or more intermediate devices.

Figures 7, 8:
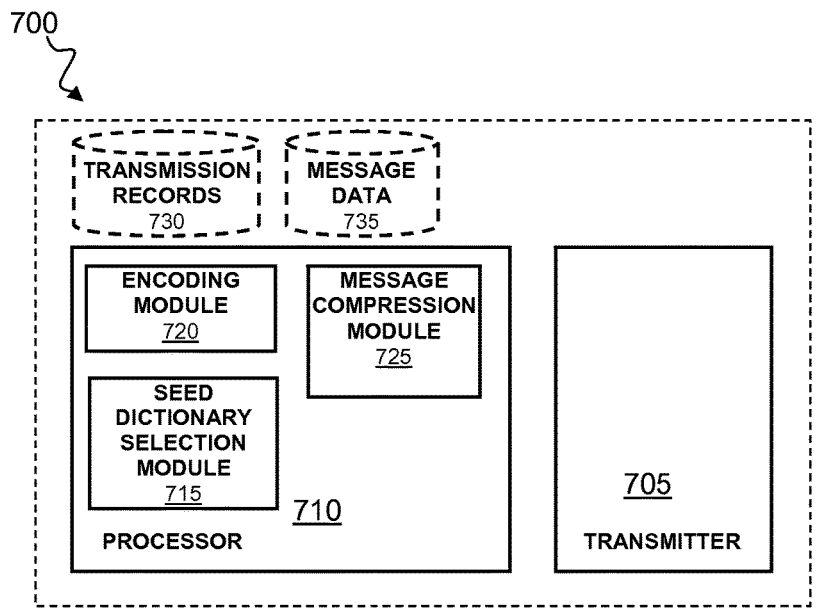
FIG. 7 is a schematic representation of a system that compresses outgoing electronic mail or other electronic messages.
FIG. 8 is a schematic representation of one implementation of an message transmission records collection.

FIG. 7 is a schematic representation of a system 700 that compresses outgoing electronic mail or other electronic messages. System 700 can be or include, e.g., one or more of electronic devices 105, 110, 115, 120 or electronic message transmission systems 130, 135, 140, 145 in electronic messaging system 100 (FIG. 1) and can perform operations such as, e.g., process 600 (FIG. 6).

System 700 includes a data transmitter 705 and a data processor 710. Data transmitter 705 is generally a wireless transmitter that is coupled to receive compressed electronic messages from data processor 705 and transmit them wirelessly.

Data processor 705 is a system of one more data processing devices that perform operations in accordance with the logic of machine-readable instructions. The processing activities can include the compression of outgoing electronic mail or other electronic messages using a coding scheme in which the correspondence between the symbols or groups of symbols and the code words is determined based on how often symbols or groups of symbols appear in the textual content that is already available to a device that is to decompress the outgoing electronic message.

In the illustrated implementation, data processor 705 includes a seed dictionary selection module 715, a encoding module 720, a message compression module 725, a collection of message transmission records 730, and message data records 135.

Seed dictionary selection module 715 is a module that is programmed to select a seed dictionary that provides the basis for compressing individual outgoing electronic messages in electronic message threads. Seed dictionary selection module 715 thus selects the textual content that is used to determine the correspondence between symbols or groups of symbols and code words. Seed dictionary selection module 715 can select a dictionary by determining that a previous electronic message in the same message thread as the outgoing electronic message has already been received by a decompressing device. The outgoing electronic messages can be messages that are composed at system 700 (e.g., when system 700 is one of electronic devices 105, 110, 115, 120) or the outgoing electronic messages can be messages that are merely relayed by system 700 (e.g., when system 700 includes one of electronic message transmission systems 130, 135, 140, 145). In some implementations, seed dictionary selection module 715 uses message transmission records in collection 730 to select the seed dictionary.

FIG. 8 is a schematic representation of one implementation of message transmission records collection 730. In the illustrated implementation, message transmission records collection 730 is a data table 800 that is stored at one or more data storage devices. in other implementations, data table that are structured differently and other data structures can be used. In the illustrated implementation, the data storage device(s) are housed within system 700. However, in other implementations, the data storage device(s) are housed outside system 700 and accessible, e.g., via data communication network.

Data table 800 includes a collection of entries 805, 810, 815, 820. Each entry 805, 810, 815, 820 is dedicated to storing information characterizing an individual prior electronic message. The information in entries 805, 810, 815, 820 is organized into a series of columns 825, 830, 835, 840, 845. Column 825 includes a time stamp identifying the time when each respective prior electronic message was sent or received. Column 830 includes a unique or other identifier of the message.

Column 835 includes a unique or other identifier of a transmitter or receiver device of each respective prior electronic message. In some implementations, the transmitter or receiver device is otherwise identified and column 835 can be omitted. For example, in some implementations, individual data tables 800 can be formed for different transmitter or receiver devices that are implicitly identifiable from the identity of the data table.

The transmitter or receiver devices need not be source devices where respective prior electronic messages are composed or recipient devices that are the final destination of the respective electronic messages. Rather, in some implementations, the transmitter or receiver devices are intermediate devices that merely relay the respective prior electronic messages. For example, with reference to system 100, electronic message transmitter systems 130, 135, 140, 145 can be identified based on having relayed the respective prior electronic message.

In some implementations, data table 800 also includes one or more columns 840 that include a unique or other identifier of other devices to which the respective prior electronic messages have been transmitted or from which they were received. The other devices can be, e.g., transmitter or receiver devices that are source devices where respective prior electronic messages were composed, recipient devices that were the final destination of the respective prior electronic messages, or intermediate devices that relayed the respective electronic prior messages.

In some implementations, a transmitter or receiver device is otherwise identified and column 840 can be omitted. For example, in some implementations, individual data tables 800 can be formed for individual transmitter or receiver devices that are implicitly identifiable from the identity of the data table.

Column 845 includes an identifier of a memory location where information characterizing a seed dictionary based on the textual content of the respective prior electronic messages can be found. For example, the entirety of the respective prior electronic messages, a portion of the respective prior electronic messages (e.g., only the textual content of the messages), or a map of the correspondence between the symbols or groups of symbols and code words formed using the textual content of the respective prior electronic messages can be stored at the identified memory locations. In some implementation, the memory location identified in column 845 is in message data records 735 (FIG. 7).

Seed dictionary selection module 715 can use the content of message transmission records collection 730 to select a seed dictionary for compressing outgoing electronic messages. For example, in some implementations, seed dictionary selection module 715 can determine that the time stamp in column 825 matches a time found in the header of an outgoing electronic message. If such a time stamp is found, then an identifier of a transmitter or receiver device in column 835, column 840, or elsewhere can be used to confirm that the message with the matching time stamp was in fact available to the device that is to decompress the textual content of the outgoing electronic message.

As another example, in some implementations, seed dictionary selection module 715 can determine that a message identifier in column 830 matches a message identifier that identifies a prior message in an electronic message thread to which an outgoing electronic message belongs. The message identifier identifying a prior message can be determined, e.g., when a composer of the outgoing electronic message indicates prior to composition that the outgoing electronic message is a follow-up message. If such a message is found, then an identifier of a transmitter or receiver device in column 835, column 840, or elsewhere can be used to confirm that the message with the matching message identifier was in fact available to the device that that is to decompress the textual content of the message for which a seed dictionary is being selected.

As another example, in some implementations, seed dictionary selection module 715 can determine that information stored at the memory location identified in column 845 matches a contiguous portion of the textual content of the outgoing electronic message. For example, the textual content can be compared to identify such matches. If such a message is found, then an identifier of a transmitter or receiver device in column 835, column 840, or elsewhere can be used to confirm that the message with the matching contiguous portion of textual content was in fact available to the device that that is to decompress the textual content of the message for which a seed dictionary is being selected.

As another example, in some implementations, seed dictionary selection module 715 can determine that two or more of a time stamp in column 825, a message identifier in column 830, or a contiguous portion of the textual content of the outgoing electronic message match.

Encoding module 720 is a module that is programmed to determine code words that express symbols or groups of symbols in a seed dictionary in accordance with a coding scheme. For example, encoding module 720 can determine code words that express the text in the seed dictionary selected by seed dictionary selection module 715 using Huffman coding, arithmetic coding, LZW coding, or other coding scheme. Encoding module 720 can output a map of the correspondence between the symbols or groups of symbols and code words formed using the seed dictionary. In some implementations, such a map is output for storage (e.g., in message data 735). In other implementations, such a map is output for impending use and then discarded thereafter. In the illustrated implementation, encoding module 720 is housed within system 700. However, in other implementations, encoding module 720 is housed outside system 700 and accessible, e.g., via data communication network.

Message compression module 725 is a module that is programmed to compress the outgoing electronic message in accordance with the map determined by encoding module 720.

Message data 735 is a collection of information that characterizes prior electronic messages. Message data 735 is stored at one or more data storage devices. In the illustrated implementation, the data storage device(s) are housed within system 700. However, in other implementations, the data storage device(s) are housed outside system 700 and accessible, e.g., via data communication network. Message data 735 can characterize the prior electronic messages in a variety of ways. For example, in some implementations, message data 735 includes the entirety of the respective prior electronic messages. In other implementations, message data 735 includes a portion of the respective prior electronic messages (e.g., only the textual content of the messages). In other implementations, message data 735 includes a map of the correspondence between the symbols or groups of symbols and code words formed by encoding module 720 using the textual content of the respective prior electronic messages. Since the size of such maps is relatively small, the size of message data 735 can be made relatively smaller in such implementations.

Figure 9:
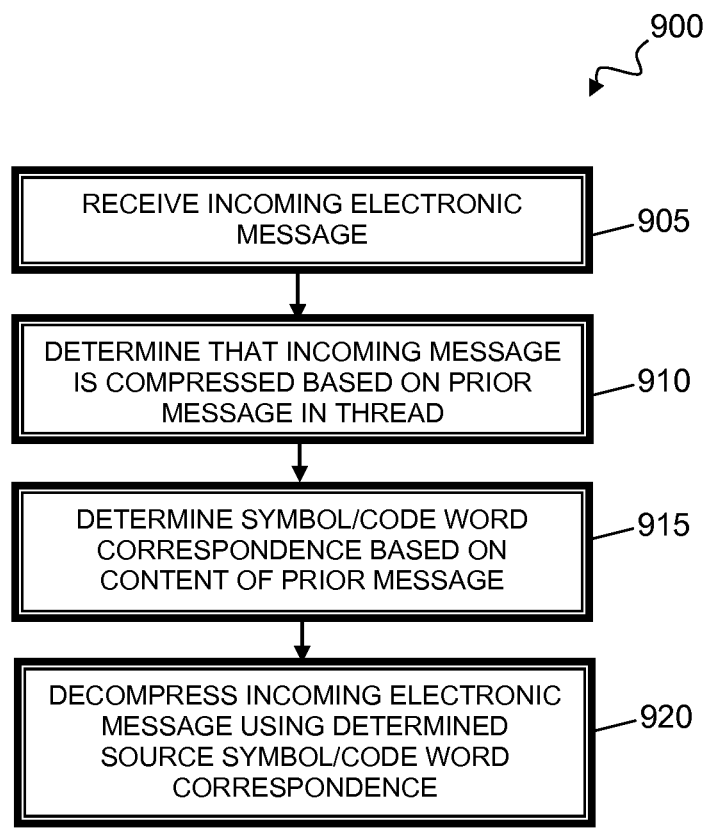
FIG. 9 is a flow chart of a process for decompressing an incoming follow-up electronic messages in an electronic message thread.

FIG. 9 is a flow chart of a process 900 for decompressing an incoming follow-up electronic messages in an electronic message thread. Process 900 can be performed by a system of one or more data processing devices that perform operations in accordance with the logic of one or more sets of machine-readable instructions. The instructions can be tangibly embodied in hardware, in software, or in combinations thereof. For example, process 900 can be performed by one or more data processing devices in electronic message transmission systems in a data communication network (e.g., electronic message transmission systems 130, 135, 140, 145 in data communication network 125). As another example, process 900 can be performed by electronic devices that are connected to a data communication network (e.g., electronic devices 105, 110, 115, 120). Process 900 can thus be performed at the device that is the final destination for the incoming follow-up electronic message (e.g., the device at which a user will the follow-up electronic message) or at an intermediate device that relays the follow-up electronic message directly or indirectly to another device. In some implementations, process 900 can be performed after wireless transmission—but before wired transmission of the follow-up electronic message—to reduce resource consumption associated with the wireless transmission but interface with other devices, e.g., that do not have access to the same prior messages or that do not decompress electronic messages as described herein.

The system performing process 900 receives an incoming electronic message at 905. The electronic message can be received, e.g., over a data communication link in a data communication network or from a memory accessible to the system. The electronic message need not be received as a unitary whole. For example, the incoming electronic message can be received in a collection of data packets.

The system performing process 900 determines that text in the incoming electronic message is compressed using symbol/code word correspondences that were yielded by applying a coding scheme to a prior message in a thread at 910. The correspondence between symbols and the code words in the incoming electronic message can thus have been determined based on how often symbols or groups of symbols appear or are estimated to appear in the prior message.

The system can determine that the incoming message is compressed based on a prior message in the thread in a number of different ways. For example, the system can recognize a flag or other indicator associated with the incoming electronic message that indicates such a compression. Such a flag or other indicator can be disposed within the incoming electronic message, appended to the incoming electronic message, or conveyed to the system separately from the incoming electronic message (e.g., in a second message that identifies the incoming electronic message). In some implementations, an identifier of the prior message from which the symbol/code word correspondence was determined can act as such an indicator or otherwise be associated with the incoming electronic message. [Alon: any other approaches?]

The system performing process 900 also determines the correspondence between symbols or groups of symbols and code words yielded by applying a coding scheme to a prior message at 915. In some implementations, a map of this correspondence is created anew in response to the determination at 910. In other implementations, a pre-existing map of this correspondence is retrieved from a memory.

In some implementations, the correspondence is determined by matching an identifier of the prior message to a memory location that stores, e.g., the prior message, textual content of the prior message, or a map created using the textual content of prior message as a seed dictionary. In some implementations, such an identifier of the prior message can be disposed within the incoming electronic message, appended to the incoming electronic message, or conveyed to the system separately from the incoming electronic message (e.g., in another message that identifies the incoming electronic message).

In some implementations, the system performing process 900 also determines which coding scheme has been used to determine the correspondence between symbols or groups of symbols and code words. For example, the system may recognize an identifier of the coding scheme in disposed within the incoming electronic message, appended to the incoming electronic message, or conveyed to the system separately from the incoming electronic message (e.g., in another message that identifies the incoming electronic message). In other implementations, a default coding scheme is used and the system performing process 900 does not make an separate determination but rather uses the default scheme.

The system performing process 900 decompresses the incoming electronic message using the determined correspondence between symbols or groups of symbols and code words at 920. Although the correspondence between symbols or groups of symbols and code words generally does not embody the frequency or estimated frequency at which symbols or groups of symbols appear in the entire incoming message, the correspondence between symbols or groups of symbols and code words does embody the frequency or estimated frequency at which symbols or groups of symbols appear in a portion of the incoming message, namely, the portion of the incoming message that is drawn from the prior message in the thread. A relatively effective compression of the incoming electronic message can thus be achieved.

Figure 10:
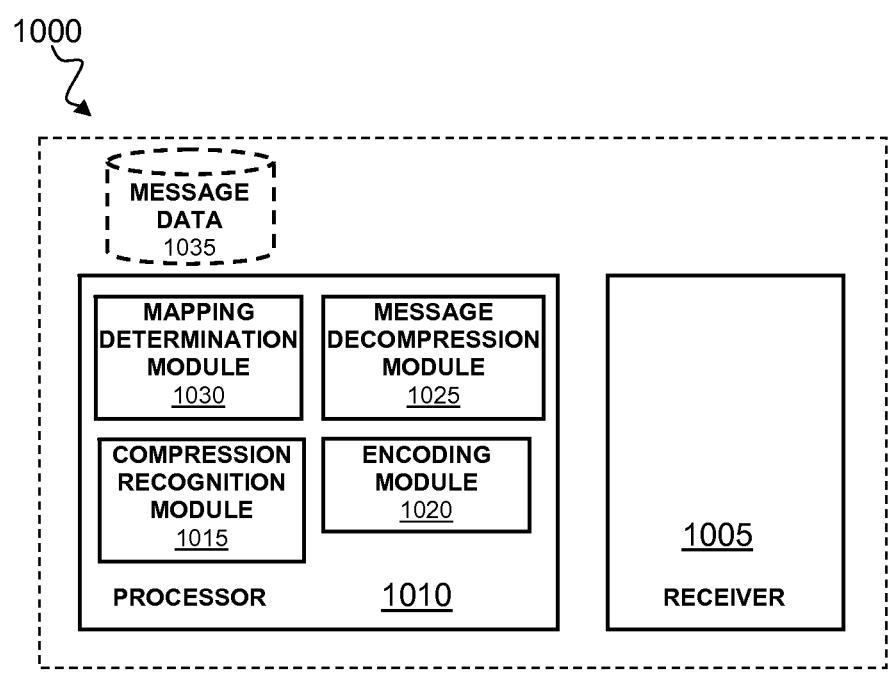
FIG. 10 is a schematic representation of a system 1000 that decompresses incoming electronic mail or other electronic messages.

FIG. 10 is a schematic representation of a system 1000 that decompresses incoming electronic mail or other electronic messages. System 1000 can form, e.g., one or more of electronic devices 105, 110, 115, 120 or electronic message transmission systems 130, 135, 140, 145 in electronic messaging system 100 (FIG. 1) and can perform operations such as, e.g., process 900 (FIG. 9).

System 1000 includes a data receiver 1005 and a data processor 1010. Data receiver 1005 is generally a wireless receiver that is coupled to receive incoming data—including electronic messages—and convey them to data processor 1010.

Data processor 1010 is a system of one more data processing devices that perform operations in accordance with the logic of machine-readable instructions. The processing activities can include the decompression of incoming electronic mail or other electronic messages using a coding scheme in which the correspondence between the symbols or groups of symbols and the code words is determined based on how often symbols or groups of symbols appear in the textual content of a prior message in the same thread.

In the illustrated implementation, data processor 1010 includes a compression recognition module 1015, a mapping determination module 1030, a text encoding module 1020, a message decompression module 1025, and message data 1015.

Compression recognition module 1015 is a module that is programmed to recognize that an incoming electronic message is compressed using symbol/code word correspondences yielded by applying a coding scheme to a prior message in a thread in which the incoming electronic message appears. For example, in some implementations, compression recognition module 1015 can recognize a flag or other indicator associated with the incoming electronic message that indicates that such a compression has occurred. In some implementations, an identifier of the prior message acts as such an indicator or is otherwise associated with the incoming electronic message.

Mapping determination module 1030 is a module that is programmed to determine the mapping between symbols or groups of symbols and code words used to compress an incoming electronic message that has been recognized by compression recognition module 1015. In some implementations, mapping determination module 1030 can determine the mapping anew by triggering the application of a coding scheme to the textual content of the prior message in the thread. In other implementations, mapping determination module 1030 can identify and retrieve a stored pre-existing map of the symbol/code word correspondence.

In some implementations, mapping determination module 1030 determines the mapping by matching an identifier of the prior message to a memory location that stores, e.g., the prior message, textual content of the prior message, or a map created using the prior message as a seed dictionary. In some implementations, mapping determination module 1030 or another module of data processor 1010 also determines which coding scheme has been used to generate the mapping.

Encoding module 1020 is a module that is programmed to determine code words that express symbols or groups of symbols in a seed dictionary in accordance with a coding scheme. For example, encoding module 1020 can determine code words that express the text in a prior message that is in the same thread as an incoming message using Huffman coding, arithmetic coding, LZW coding, or other coding scheme. Encoding module 1020 can output a map of the correspondence between the symbols or groups of symbols and code words formed using the seed dictionary. In some implementations, such a map is output for storage (e.g., in message data 1035). In other implementations, such a map is output for impending use (e.g., in response to a trigger from mapping determination module 1030) and then discarded thereafter. In the illustrated implementation, encoding module 1020 is housed within system 1000. However, in other implementations, encoding module 1020 is housed outside system 1000 and accessible, e.g., via data communication network.

Message decompression module 1025 is a module that is programmed to decompress the incoming electronic message in accordance with the mapping determined by mapping determination module 1030.

Message data 1015 is a collection of information that characterizes prior electronic messages. Message data 1015 is stored at one or more data storage devices. In the illustrated implementation, the data storage device(s) are housed within system 1000. However, in other implementations, the data storage device(s) are housed outside system 1000 and accessible, e.g., via data communication network. Message data 1015 can characterize the prior electronic messages in a variety of ways. For example, in some implementations, message data 1015 includes the entirety of respective prior electronic messages. In other implementations, message data 1015 includes a portion of respective prior electronic messages (e.g., only the textual content of the messages). In other implementations, message data 1015 includes a map of the correspondence between the symbols or groups of symbols and code words formed by encoding module 1020 using the textual content of the respective prior electronic messages. Since the size of such maps is relatively small, the size of message data 1015 can be made relatively smaller in these implementations.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, although the systems and techniques herein are described with respect to the communication and compression of text messages, non-textual content (including, e.g., images, audio, and video content) can also be correspondingly compressed.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a system that includes one or more data processing devices, the method comprising:
   receiving, at the system, an outgoing electronic message;
   determining, by the system, that the outgoing electronic message is in an electronic message thread that also includes a previously-transmitted electronic message that is separate from the outgoing electronic message and that is available to the system;
   identifying, by the system, textual content that is in the previously-transmitted electronic message and that was composed before the outgoing electronic message was received;
   determining, by the system, a correspondence between symbols or groups of symbols in the previously-transmitted electronic message of the message thread that is available to the system, and code words in accordance with a coding scheme that uses content of the previously-transmitted electronic message as a seed dictionary;
   compressing, by the system, content in the outgoing electronic message using the determined correspondence between the symbols or groups of symbols in the previously-transmitted electronic message of the message thread for which the outgoing electronic message is a follow-up message, and the code words; and
   transmitting, from the system, the compressed outgoing electronic message having code words that correspond to the symbols or groups of symbols in the previously-transmitted electronic message of the message thread.

2. A method performed by a system that includes one or more data processing devices, the method comprising:
   receiving, at the system, an outgoing electronic message;
   determining, by the system, that the outgoing electronic message is a follow-up message in an electronic message thread that includes a previously-transmitted electronic message that is separate from the outgoing electronic message;
   identifying, by the system, textual content that is in the previously-transmitted electronic message, and that is available to the system;
   determining, by the system, a correspondence between symbols or groups of symbols in the textual content of the previously-transmitted electronic message, and code words in accordance with a coding scheme that uses content of the previously-transmitted electronic message as a seed dictionary;
   compressing, by the system, content in the outgoing electronic message using the determined correspondence between the symbols or groups of symbols in the previously-transmitted electronic message of the electronic message thread, and the code words; and
   transmitting, from the system, the compressed outgoing electronic message having code words that correspond to the symbols or groups of symbols in the textual content of the previously-transmitted electronic message of the electronic message thread,
   wherein determining the correspondence between the symbols or groups of symbols in the textual content of the electronic message of the electronic message thread and the code words comprises locating, in a data storage device, a preexisting mapping of the symbols or groups of symbols and the code words in accordance with the coding scheme, wherein the mapping was created using content of the previously-transmitted electronic message as a seed dictionary.

3. The method of claim 1, wherein determining the correspondence between the symbols or groups of symbols and the code words comprises:
   identifying a prior message in the electronic message thread that is available to the system; and
   encoding text of the prior message using the coding scheme in response to the identification of the prior message.

4. The method of claim 1, further comprising transmitting an identifier of the textual content in the electronic message thread that is available to the system in association with the compressed outgoing electronic message.

5. The method of claim 1, further comprising transmitting an identifier of the coding scheme along with transmitting the compressed outgoing electronic message so that a recipient of the compressed outgoing electronic message can decode the message using the coding scheme.

6. The method of claim 1, wherein determining that the outgoing electronic message is a follow-up message in an electronic message thread comprises one or more of:
   a) recognizing that textual content in a subject line in a current header of the outgoing electronic message identifies the message as a follow-up message; and
   b) recognizing that the electronic message includes one or more message headers of a prior message in the electronic message thread.

7. The method of claim 1, wherein:
   receiving the outgoing electronic message comprises receiving the outgoing electronic message over a wired connection in a data communication network; and
   transmitting the compressed outgoing electronic message comprises relaying the compressed outgoing electronic message over a wireless connection.

8. A method performed by a system the includes one or more data processing devices, the method comprising:
- receiving, at the system, an incoming electronic message;
- determining, by the system, that the incoming electronic message has been compressed using symbol/code word correspondences yielded by application of a coding scheme to a prior electronic message, wherein the prior electronic message and incoming electronic message both belong to a common electronic message thread and the prior electronic message preceded the incoming electronic message in the common electronic message thread;
- determining, by the system, a correspondence between symbols or groups of symbols in the textual content of the prior message of the common electronic message thread, and code words in accordance with the coding scheme, using the textual content of the prior message as a seed dictionary for the coding; and
- decompressing, by the system, content in the incoming electronic message using the determined correspondence between the symbols or groups of symbols in the textual content of the prior message of the common electronic message thread, and the code words,
- wherein the textual content is separate from the incoming electronic message.

9. The method of claim 8, wherein determining the correspondence between the symbols or groups of symbols and the code words comprises locating, in a data storage device, a preexisting mapping of the symbols or groups of symbols and the code words in accordance with the coding scheme.

10. The method of claim 8, wherein determining the correspondence between symbols or groups of symbols and code words comprises:
- locating, in a data storage device, the prior message in the electronic message thread; and
- encoding text of the prior message using the coding scheme in response to the identification of the prior message.

11. The method of claim 8, further comprising:
- receiving an identifier of the prior message in the electronic message thread, the identifier being associated with the incoming electronic message; and
- locating either a) a preexisting mapping of the symbols or groups of symbols in the prior message and the code words or b) text of the prior message in a data storage device using the received identifier.

12. The method of claim 11, wherein determining that the incoming electronic message has been compressed comprises the receiving of the identifier of the prior message.

13. The method of claim 8, further comprising receiving an identifier of the coding scheme along with the incoming electronic message, and using the coding scheme to decode the incoming electronic message.

14. The method of claim 8, wherein:
- receiving the incoming electronic message comprises receiving the incoming electronic message over a wireless connection; and
- the method further comprises relaying, by the system, the decompressed outgoing electronic message to a final destination device over a wired connection in a data communication network.

15. A device comprising:
- a transmitter; and
- one or more data processing devices and associated memory programmed to implement:
  - a seed dictionary selection module programmed to perform operations comprising selecting textual content in electronic messages that are separate from an outgoing electronic message but in a common message thread as the outgoing electronic message, for use as a seed dictionary for compressing the outgoing electronic message, wherein the outgoing electronic message includes at least some textual content absent from the selected textual content and some textual content from the selected textual content, and wherein the textual content is separate from the outgoing electronic message; and
  - a message compression module programmed to perform operations comprising compressing content in the outgoing electronic message in accordance with code words determined using the textual content in electronic messages that are separate from but in a common message thread as the outgoing electronic message, selected by the seed dictionary selection module as the seed dictionary.

16. The device of claim 15, wherein the one or more data processing devices are also programmed to implement an encoding module programmed to perform operations comprising determining code words that express symbols or groups of symbols in the textual content selected by the seed dictionary selection module in accordance with a coding scheme.

17. The device of claim 15, wherein the seed dictionary selection module is programmed to perform operations comprising:
- identifying that a prior message in the same thread as the outgoing electronic message was transmitted or received by a decompressing device that is to decompress the outgoing electronic message; and
- in response to the identification that the prior message was transmitted or received by the decompressing device, selecting the same message as the source of the textual content.

18. The device of claim 15, wherein:
- the device comprises a handheld device comprising a user interface;
- the transmitter comprises a wireless transmitter; and
- the seed dictionary selection module is programmed to perform operations comprising:
  - receiving, over the user interface, an indication that the outgoing electronic message is to be composed using the user interface as a follow-up message to a prior message in the same thread, and
  - in response to the receipt of the indication, selecting textual content of the prior message for use as the seed dictionary.

19. The device of claim 15, further comprising a data storage device accessible by the one or more data processing devices, the data storage device storing mappings of symbols or groups of symbols in text of a plurality of prior messages and code words.

20. The device of claim 15, further comprising a data storage device accessible by the one or more data processing devices, the data storage device storing information identifying a plurality of electronic messages and a plurality of devices as having transmitted or received the electronic messages in the plurality.

21. The device of claim 15, one or more data processing devices are programmed to instruct the transmitter to transmit the compressed outgoing electronic message in association with an identifier of the textual content selected by the seed dictionary selection module.

22. The device of claim 15, one or more data processing devices are programmed to instruct the transmitter to transmit the compressed outgoing electronic message in association with an identifier of the coding scheme used to determine the code words with the textual content selected by the seed dictionary selection module.

23. The device of claim 15, wherein:
the device comprises a network interface configured to form a wired interface with a data communication network;
the transmitter comprises a wireless transmitter; and
the one or more data processing devices are programmed to perform operations comprising either:
  a) recognizing that textual content in a subject line in a current header of the outgoing electronic message identifies the message as a follow-up message; or
  b) recognizing that the electronic message includes one or more message headers of prior message in the electronic message thread.

24. A device comprising:
a receiver; and
one or more data processing devices and associated memory programmed to implement:
  a compression recognition module programmed to perform operations comprising recognizing that an incoming electronic message is compressed using symbol/code word correspondences yielded by applying a coding scheme to a prior electronic message, wherein the prior electronic message and the incoming electronic message both belong to a common electronic message thread of messages and creation of the prior electronic message preceded creation of the incoming electronic message in time;
  a mapping determination module programmed to determine mapping between symbols or groups of symbols and code words used to compress the content in the incoming electronic message, wherein the mapping is determined using textual content that is part of the prior electronic message of the electronic message thread as a seed dictionary for an encoding scheme for the incoming electronic message; and
  a message decompression module programmed to perform operations comprising decompressing content in the incoming electronic message using the mapping determined by the mapping determination module, based at least in part on textual content of the prior electronic message of the electronic message thread.

25. The device of claim 24, wherein the one or more data processing devices are also programmed to implement an encoding module programmed to perform operations comprising determining code words that express symbols or groups of symbols in the prior message in the thread.

26. The device of claim 24, wherein:
the device comprises a handheld device comprising a user interface;
the receiver comprises a wireless receiver; and
the one or more data processing devices are programmed to perform operations comprising
  receiving, over the wireless receiver, the incoming electronic message and
  present the decompressed incoming electronic message over the user interface.

27. The device of claim 24, wherein:
the device further comprises a data storage device accessible by the one or more data processing devices, the data storage device storing mappings of symbols or groups of symbols in text of a plurality of prior messages and code words; and
the mapping determination module is programmed to access the mappings of symbols or groups of symbols stored at the data storage device to determine the mapping used to compress the incoming electronic message.

28. The device of claim 24, wherein:
the device further comprises a data storage device accessible by the one or more data processing devices, the data storage device storing text of a plurality of prior messages; and
the mapping determination module is programmed to determine an identifier of the prior message in the thread that is associated with the incoming electronic message and identify the text of the prior message in the thread in the data storage device using the identifier of the prior message.

29. The device of claim 24, wherein:
the device comprises a network interface configured to form a wired interface with a data communication network;
the receiver comprises a wireless receiver and
the one or more data processing devices are programmed to perform operations comprising
  receiving the incoming electronic message over the wireless receiver; and
  relaying, by the system, the decompressed outgoing electronic message to a final destination device over the wired interface.

* * * * *